(12) United States Patent
Wang et al.

(10) Patent No.: US 7,264,275 B2
(45) Date of Patent: Sep. 4, 2007

(54) OCCUPANT RESTRAINT SYSTEM

(75) Inventors: Jenne-Tai Wang, Rochester, MI (US); Bing Deng, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/293,684

(22) Filed: Dec. 2, 2005

(65) Prior Publication Data

US 2006/0125223 A1    Jun. 15, 2006

Related U.S. Application Data

(60) Provisional application No. 60/635,426, filed on Dec. 10, 2004.

(51) Int. Cl.
*B60R 22/00* (2006.01)
(52) U.S. Cl. .................................. 280/801.1; 297/468
(58) Field of Classification Search ............. 280/802, 280/807, 751, 753, 733, 730.1, 801.1, 808; 297/464, 481, 487
See application file for complete search history.

(56) References Cited

U.S. PATENT DOCUMENTS

| | | | | |
|---|---|---|---|---|
| 2,703,413 A * | 3/1955 | Klebanoff | ..................... | 5/94 |
| 3,648,306 A * | 3/1972 | Auerbach | ..................... | 5/94 |
| 3,909,039 A * | 9/1975 | Barenyi et al. | ............. | 280/749 |
| 4,924,814 A * | 5/1990 | Beaudet | ..................... | 119/712 |
| 5,131,682 A * | 7/1992 | Reed | ..................... | 280/801.1 |
| 5,752,719 A * | 5/1998 | Mitschelen et al. | ...... | 280/801.1 |
| 6,004,084 A * | 12/1999 | Moker | ..................... | 410/118 |
| 6,217,068 B1 * | 4/2001 | Trainum et al. | ......... | 280/801.1 |
| 6,367,839 B1 * | 4/2002 | Langhoff | ..................... | 280/751 |
| 6,428,044 B1 * | 8/2002 | Ghantae | ..................... | 280/748 |
| 6,612,606 B1 * | 9/2003 | Bergenheim et al. | .... | 280/728.1 |
| 2001/0008337 A1 * | 7/2001 | Ganesan | .................. | 280/801.1 |
| 2003/0164610 A1 * | 9/2003 | Edrich et al. | ............... | 280/806 |

* cited by examiner

*Primary Examiner*—Eric Culbreth
*Assistant Examiner*—Leonard McCreary, Jr.

(57) ABSTRACT

A restraint system for restraining a recumbent occupant of a vehicle seat surface includes a member being selectively movable between a stowed position and a deployed position. The member, when in the deployed position, extends higher than the seat surface and is configured to exert a reaction force on the recumbent occupant to retain the occupant above the seat surface in the event of a vehicle impact.

2 Claims, 3 Drawing Sheets

OCCUPANT RESTRAINT SYSTEM

CROSS REFERENCE TO RELATED APPLICATION

This application claims the benefit of U.S. Provisional Patent Application No. 60/635,426, filed Dec. 10, 2004, and which is hereby incorporated by reference in its entirety.

TECHNICAL FIELD

This invention relates to vehicle restraint systems for recumbent occupants of a vehicle.

BACKGROUND OF THE INVENTION

Vehicles typically include various restraint devices to restrain occupants in the event of a vehicle impact. These restraint devices include seat belts and airbags configured to restrain an occupant seated in an upright position. Seat belts in use in most passenger vehicles are three point seat belts, with webbing that forms a lap belt portion and a shoulder belt portion.

SUMMARY OF THE INVENTION

A vehicle restraint system for restraining a recumbent occupant of a vehicle seat is provided. The vehicle seat defines an occupiable surface for supporting the recumbent occupant. The restraint system includes a member that is selectively movable between a stowed position and a deployed position. In the deployed position, the member is sufficiently positioned to exert a reaction force on the occupant in the event of a vehicle impact and thereby retain the occupant above the occupiable surface. The member may provide benefits for frontal, oblique, and side impacts, as well as for rollover situations.

In an exemplary embodiment, the member is a retaining wall. In the stowed position, the retaining wall is packaged under the seat for interior aesthetics and the comfort of a seated, i.e., upright, occupant. In the deployed position, the retaining wall extends higher than the forward edge of the seat to provide frontal impact protection for a recumbent occupant.

In another exemplary embodiment, the member is an inflatable restraint cushion. The restraint system preferably includes a housing for stowing the inflatable cushion, and an air supply and release means. The housing and uninflated cushion are packaged under the seat for interior aesthetics and the comfort of a seated occupant in the stowed position. In the deployed position, the cushion is at least partially removed from the housing and pre-filled with air to a predetermined pressure to provide frontal impact protection for a recumbent occupant.

In yet another exemplary embodiment, the member is a seat belt configured to selectively extend over the forward edge of the occupiable surface.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
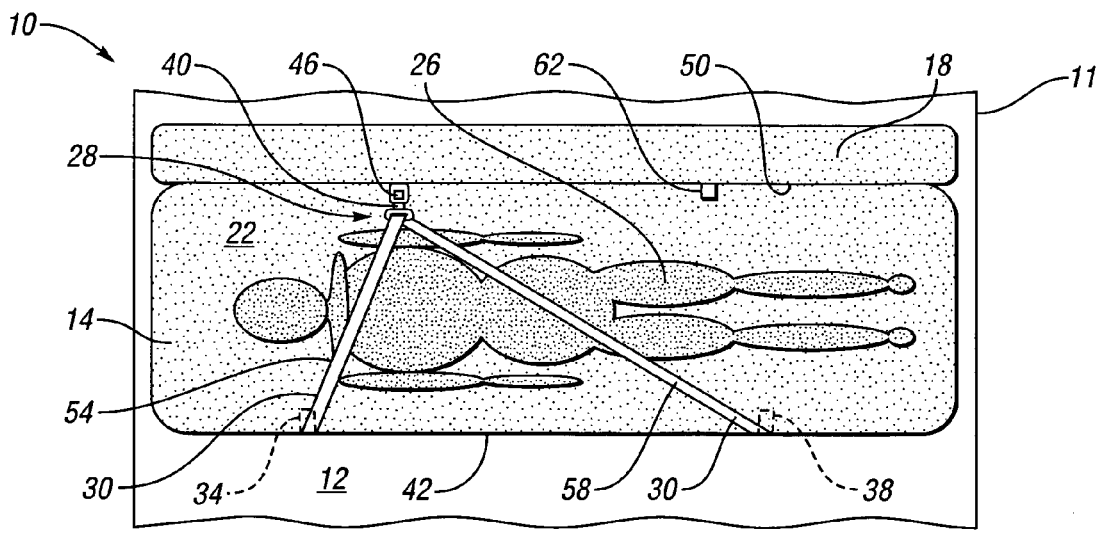
FIG. 1 is a schematic top view of a rear vehicle seat with a seat belt restraint system for a recumbent occupant of the seat.

Referring to FIG. 1, a vehicular rear seat assembly 10 is schematically depicted mounted with respect to the structure of a vehicle 11 so as to be positioned above a vehicle passenger compartment floor 12. The rear seat assembly 10 includes a lower seat portion 14, sometimes referred to as a "seat base," that is generally transversely oriented with respect to the vehicle 11. The rear seat assembly 10 also includes a seatback portion 18. The lower seat portion 14 includes an occupiable upper surface 22 that is generally horizontal and upon which a vehicle occupant 26 may lie in a recumbent, i.e., lying down, position. Thus, the occupant 26 shown in FIG. 1 is generally horizontally oriented and transversely oriented with respect to the vehicle 11.

A restraint system 28 for use with the seat assembly 10 includes a restraint member, namely seat belt 30. One end 34 of the seat belt 30 is mounted with respect to the vehicle structure at the underside of the lower seat portion 14, beneath surface 22. The other end 38 of the seat belt 30 is also mounted with respect to the vehicle structure at the underside of the lower seat portion 14, beneath surface 22; the mounting points for the ends 34, 38 of the seat belt 30 are spaced apart from one another transversely with respect to the vehicle. At least one of the ends 34, 38 of the seat belt 30 is preferably mounted to the underside of the lower seat portion 14 by a seat belt retractor (not shown in FIG. 1). The seat belt 30 is selectively extendable over the forward edge 42 of the occupiable surface 22, as shown in FIG. 1.

A latch plate 40 is slidably connected to the seat belt 30. A buckle 46 is mounted with respect to the vehicle structure at a point rearward from where the seat belt ends 34, 38 are mounted with respect to the vehicle structure, and is adjacent the rearward edge 50 of the occupiable surface 22. The latch plate 40 separates a first segment 54 of the seat belt 30 and a second segment 58 of the seat belt 30. Since the latch plate 40 is slidably connected to the seat belt 30, the lengths of segments 54, 58 are selectively variable by sliding the latch plate 40 along the seat belt 30. In an alternative embodiment, and within the scope of the claimed invention, the latch plate 40 may be nonslidably connected to the seat belt 30, particularly if one or more of the seat belt ends 34, 38 is connected with respect to the vehicle structure by a retractor. In such an embodiment, segments 54, 58 may be separate pieces that are connected to the latch plate and that cooperate to form the seat belt 30.

The seat belt buckle 46 is releasably engageable with the latch plate 40 to retain the seat belt in the position shown in FIG. 1, wherein the first segment 54 of the seat belt 30 extends from the forward edge 42 to the buckle 46 at the rearward edge 50, above and across the occupiable surface 22 and recumbent occupant 26; and wherein the second segment 58 of the seat belt extends from the forward edge 42 to the buckle 46 at the rearward edge 50, above and across the occupiable surface 22 and recumbent occupant 26. Segment 54 extends across the chest of the occupant 26, and segment 58 extends across a thigh of the occupant 26. The seat belt 30 provides a reaction force on occupant 26 to retain the occupant 26 on the surface 22 in the event of a vehicle impact. The seat belt 30 is selectively movable to a stowed position by disengaging the latch plate 40 from the buckle 46.

The vehicle seat assembly includes a second buckle 62 spaced transversely from the first buckle 46. The first and second buckles 46, 62, may be employed with conventional three-point seat belts (not shown) for seated occupants. Latch plate 40 is engageable with the second buckle 62 for use if the occupant 26 is positioned 180 degrees from the position shown in FIG. 1.

Figure 2:
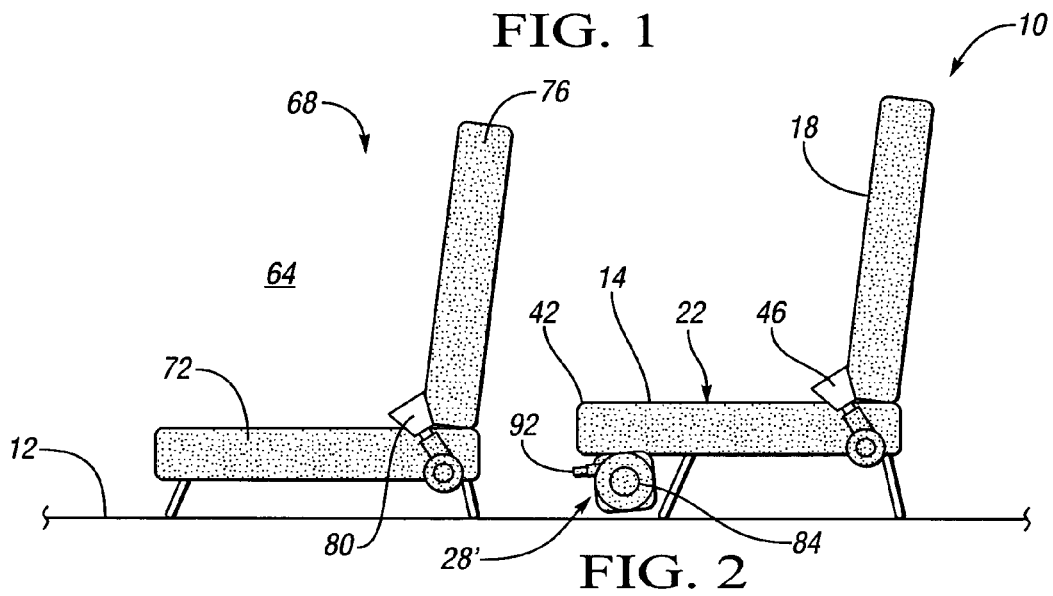
FIG. 2 is a schematic, cross-sectional side view of a rear vehicle seat with an alternative seat belt restraint system in a retracted or stowed position.

Referring to FIG. 2, an alternative seat belt restraint system 28' for use with the rear seat assembly 10 is schematically depicted. FIG. 2 provides a sectional view of the rear seat assembly 10 taken along a vertical plane at the first buckle 46. The rear seat assembly 10 is located in the interior compartment 64 of the vehicle behind a front seat assembly 68. Seat assemblies 10, 68 are supported above or on the vehicle floor 12. The front seat assembly 68 includes a lower seat portion 72 and a seatback portion 76. A buckle 80 is engageable with a latch plate (not shown) on a seat belt (not shown) for the front seat assembly 68.

A seat belt retractor 84 is mounted to the underside of the lower seat portion 14 of the rear seat assembly 10. The retractor 84 biases a seat belt, shown at 88 in FIG. 3, in a retracted position in which the seat belt is contained within the retractor housing, as understood by those skilled in the art. At least a portion of the latch plate 92 of the seat belt remains exposed outside of the retractor housing to enable a user to pull the seat belt from the retracted position to an extended position, as shown in FIG. 3.

Figure 3:
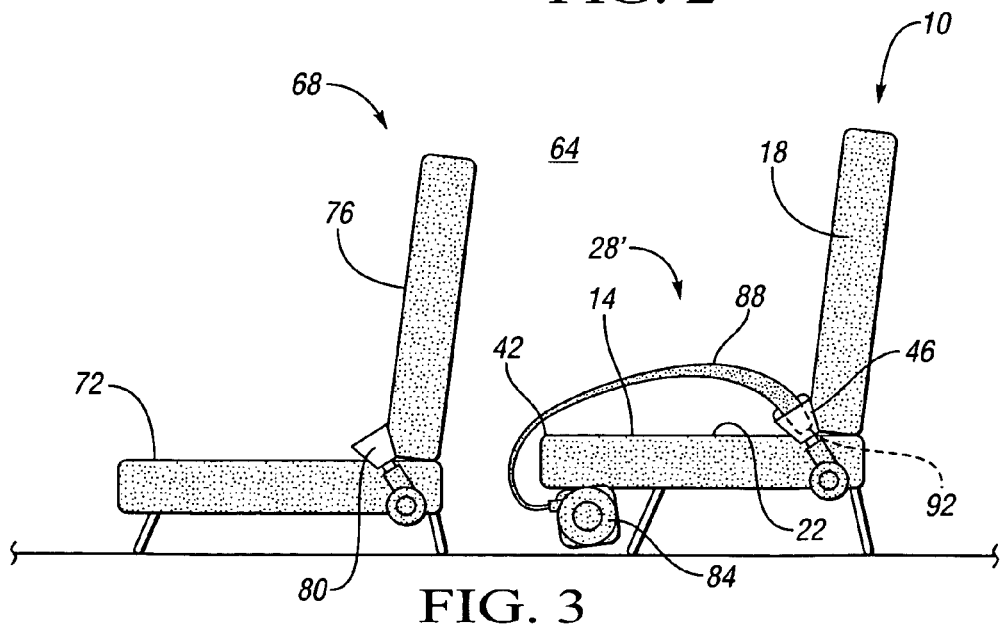
FIG. 3 is a schematic, cross-sectional side view of the rear vehicle seat of FIG. 2 with the alternative seat belt restraint system in an extended or deployed position.

Referring to FIG. 3, in the extended, or deployed, position, the seat belt 88 extends over and across the occupiable surface 22 and the forward edge 42, and the latch plate 92 engages with the buckle 46 to retain the seat belt 88 in the extended position. The seat belt 88 provides a reaction force to restrain a recumbent occupant (not shown) on the occupiable surface 22. In the embodiment depicted in FIGS. 2 and 3, a second retractor houses a seat belt that is extendable to engage with the second buckle (shown at 62 in FIG. 1). If only one seat belt is employed, it is preferable for the seat belt to extend across the chest of a recumbent occupant in the extended position. It may be desirable to employ a pretensioner (not shown) or a load-limiter (not shown) with the seat belt systems shown in FIGS. 1-3.

Figure 4:
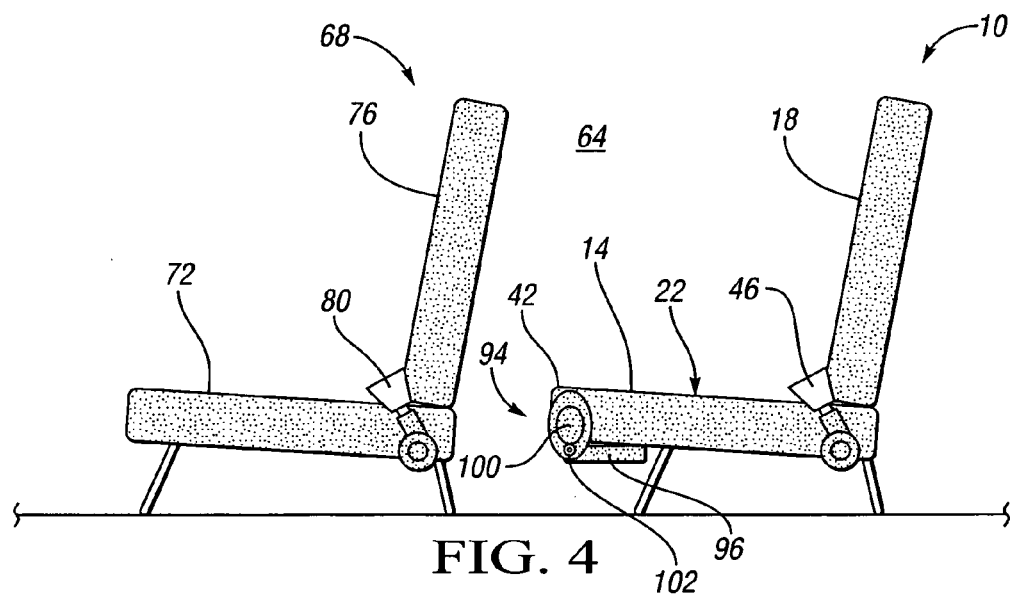
FIG. 4 is a schematic, sectional side view of a rear vehicle seat with a retaining wall restraint system in a stowed position.

Referring to FIG. 4, wherein like reference numbers refer to like components from FIGS. 1-3, another restraint system 94 is depicted for use with the rear seat assembly 10. The restraint system 94 includes a restraint member, namely retaining wall 96, that is movably connected to the lower seat portion 14 of the rear seat assembly via an interconnecting member 100. The interconnecting member 100 is selectively rotatable with respect to the lower seat portion 14. The retaining wall 96 is pivotably connected to the interconnecting member 100 at pivot 102. In an exemplary embodiment, restraint system 94 includes two interconnecting members 100, each being positioned on respective sides of the lower seat portion 14.

The retaining wall 96 is depicted in a stowed position in FIG. 4. In the stowed position, the retaining wall 96 is located entirely under the occupiable surface 22 and beneath the lower seat portion 14. A locking mechanism (not shown) releasably locks the interconnecting member 100 with respect to the lower seat portion 14 to prevent rotation of the interconnecting member 100 with respect to the lower seat portion 14. Another locking mechanism releasably locks the retaining wall 96 with respect to the interconnecting member 100 to prevent the retaining wall from pivoting with respect to the interconnecting member 100. The member 100 and the wall 96 are lockable in the stowed position shown in FIG. 4.

Figure 5:
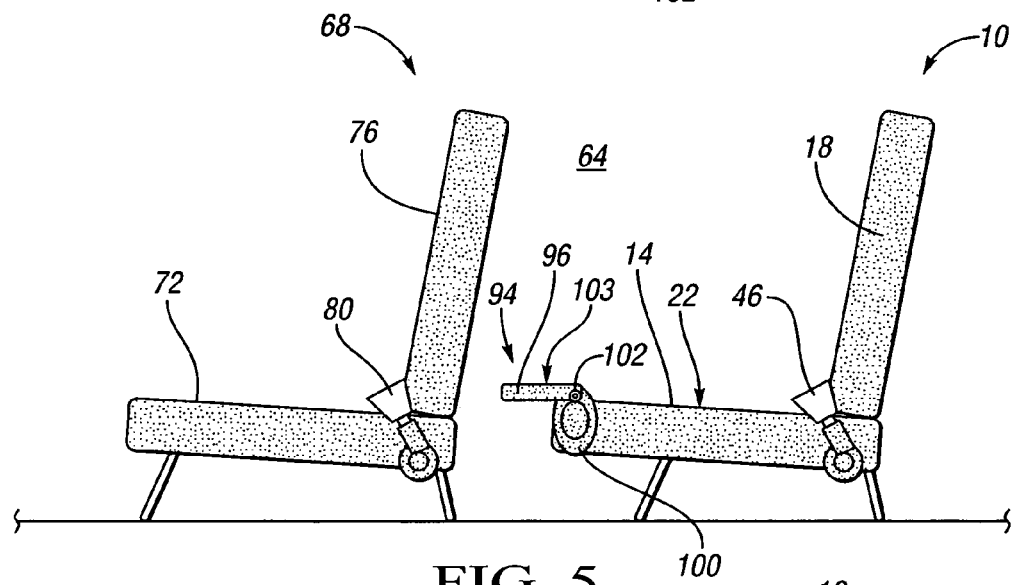
FIG. 5 is a schematic, sectional side view of the rear vehicle seat of FIG. 4 with the retaining wall in an intermediate position.

By releasing one of the locking mechanisms, the interconnecting member 100 is rotatable 180 degrees from its position in FIG. 4 to the position shown in FIG. 5. Referring to FIG. 5, the retaining wall 96 rotates with the interconnecting member so as to be in the position shown. The interconnecting member is releasably locked in the position shown. By releasing one of the locking mechanisms, the retaining wall 96 is pivotable with respect to the member 100 about pivot 102 so that the restraint system 94 is in a deployed position as shown in FIG. 6.

Figure 6:
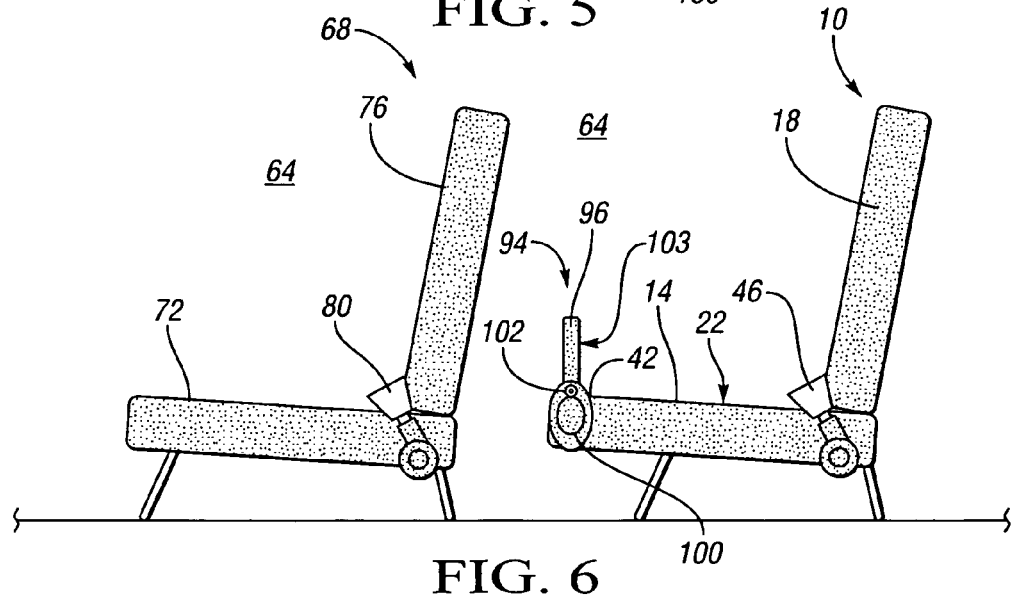
FIG. 6 is a schematic, sectional side view of the rear vehicle seat of FIGS. 4 and 5 with the retaining wall in an extended or deployed position.

Referring to FIG. 6, wherein like reference numbers refer to like components from FIGS. 1-5, the retaining wall 96 is locked in the deployed position, in which it extends vertically upward from the forward edge 42 of the occupiable surface 22, and is sufficiently configured and positioned to restrain a recumbent occupant of the seat assembly 10 above the occupiable surface 22 at the forward edge 42 in the event of a frontal vehicle impact. In the context of the present invention, "above" a surface includes being on the surface.

Figure 7:
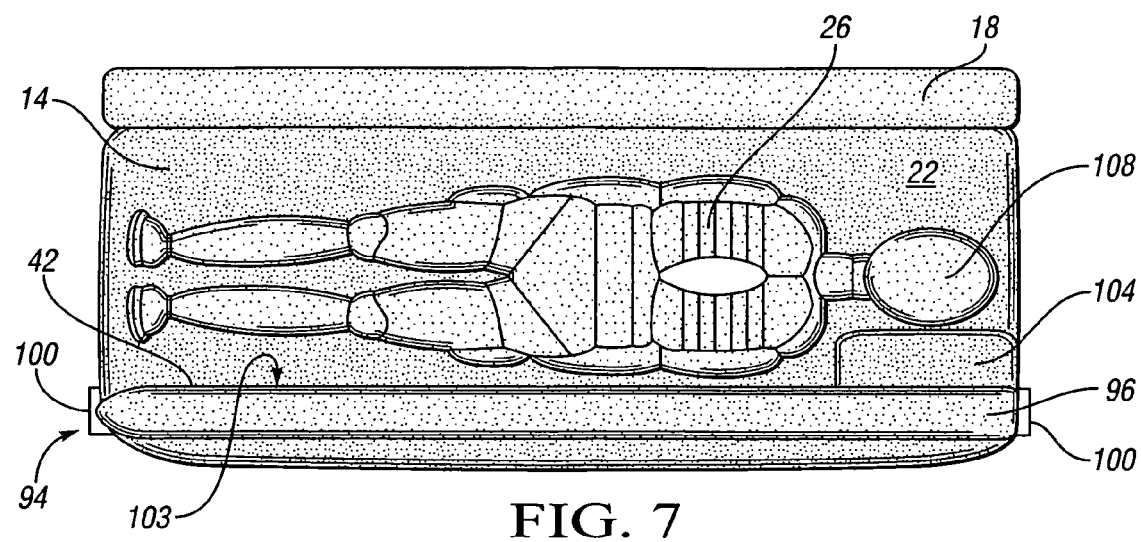
FIG. 7 is a schematic top view of the rear seat assembly of FIGS. 4-6 with the retaining wall in the extended or deployed position.

Referring to FIG. 7, wherein like reference numbers refer to like components from FIGS. 1-6, the wall 96 extends substantially the entire length of the lower seat portion 14 and the occupiable surface 22, from one side of the vehicle interior to the other. In the context of the present invention, a member that extends at least seventy percent of the length of an occupiable surface extends "substantially the entire length" of the occupiable surface.

The wall 96 defines a surface 103 that faces rearward to face occupant 26. The surface 103 includes a protuberance that, in the embodiment depicted, is formed by a cushion block 104. Cushion block 104 is placed between the occupant's head 108 and the retaining wall 96 to control head kinematics. The cushion block 104 may be permanently affixed to the wall 96, or may be removably secured to the wall 96 by releasable fasteners, such as a hook and loop fastening system (not shown). In order to provide a substantial reaction force on the occupant in the event of a frontal impact to the vehicle, the retaining wall 96 is a generally nonflexible barrier. For example, and within the scope of the claimed invention, the retaining wall 96 may include a metal frame to render the wall 96 generally nonflexible, but also include cushions, foam, etc., surrounding the frame for occupant comfort.

It may be desirable for the wall 96 to include segments (not shown) that extend on respective opposite sides of the occupant 26, between the occupant 26 and the sides of the interior compartment.

Figure 8:
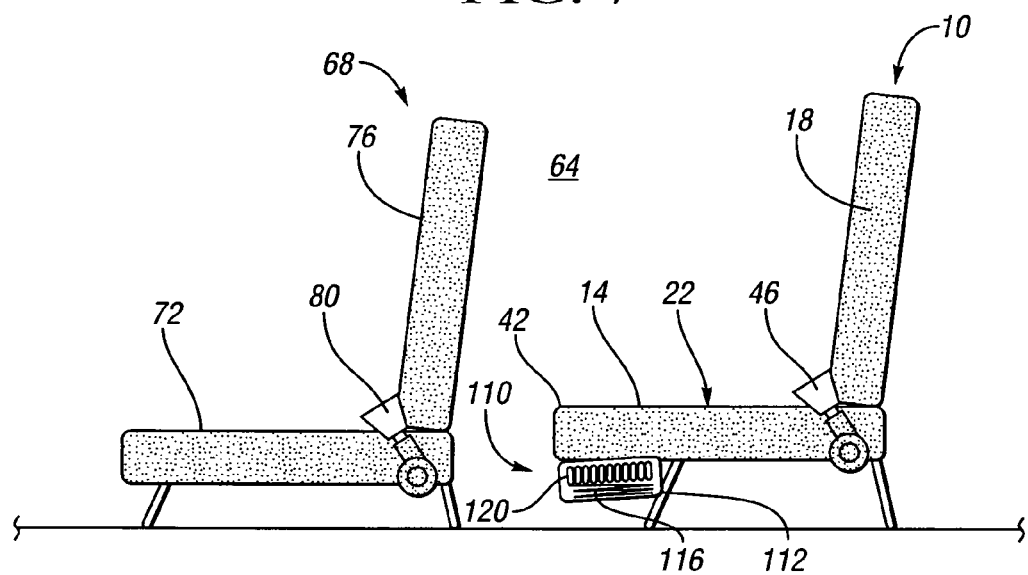
FIG. 8 is a schematic, sectional side view of a rear vehicle seat with an inflatable cushion restraint system in a deflated, stowed position.

Referring to FIG. 8, another alternative restraint system 110 for use with the rear seat assembly 10 is schematically depicted. The alternative restraint system 110 includes a housing 112 mounted to the underside of the lower seat portion 14 of the rear seat assembly 10. The housing 112 contains an inflatable cushion 116, shown in a stowed, deflated condition in FIG. 8. The housing 112 also contains an air supply such as mechanical pump 120 configured to selectively inflate the inflatable cushion 116. Alternatively, and within the scope of the claimed invention, the inflatable cushion may be inflatable manually, e.g., by mouth. The restraint system of FIG. 8 is used by inflating the cushion 116 prior to occupancy of the rear seat by a recumbent occupant.

Figure 9:
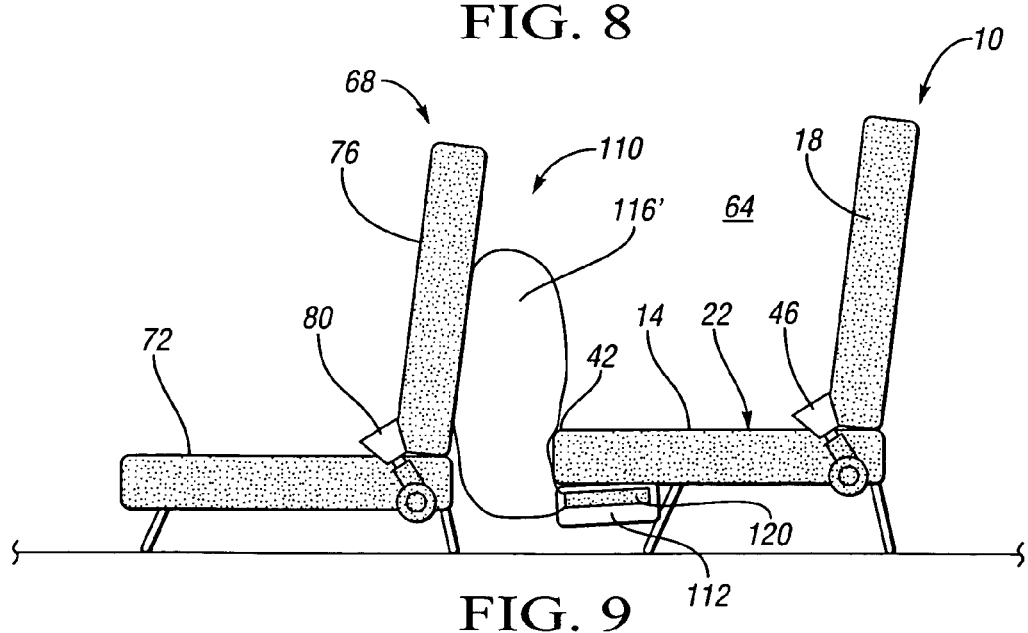
FIG. 9 is a schematic, sectional side view of the rear seat of FIG. 8 with the cushion in an inflated, deployed position.

Referring to FIG. 9, the inflatable cushion is depicted in a deployed, inflated condition at 116' in which the cushion extends from below the lower seat portion 14 to above the forward edge 42 of the lower seat portion 14. The cushion 116' substantially fills the space between the lower seat portion 14 and the front seat assembly 68, and contacts the rear surface of the seatback portion 76 of the front seat assembly 68 above the forward edge 42 of the lower seat portion 14.

The cushion 116' extends substantially the entire length of the lower seat portion from one side of the vehicle interior compartment to the other, and is configured and positioned to exert a reaction force on a recumbent occupant of the occupiable surface 22, and thereby restrain the occupant above surface 22 at the forward edge 42 in the event of a frontal vehicle impact. The rear surface of the seatback portion 76 provides a reaction surface for the cushion 116'.

It may be desirable for the cushion to include protuberances (not shown) that extend over surface 22 on opposite sides of a recumbent occupant, such that the surface of the cushion 116' that faces the occupant defines a concavity. The protuberances would separate the occupant from the sides of the vehicle body.

It may be desirable to employ the restraint systems of FIGS. 4-9 with one of the seat belt restraint systems of FIGS. 1-3. It may also be desirable for sensors to monitor the position of a seat occupant, and for a controller to modify the relative placement or force of other restraints such as airbags, when the occupant is in a recumbent position.

While the best modes for carrying out the invention have been described in detail, those familiar with the art to which this invention relates will recognize various alternative designs and embodiments for practicing the invention within the scope of the appended claims.

The invention claimed is:

1. A seat assembly for a vehicle, comprising:
   a seat including an occupiable surface that is configured to be generally horizontally oriented when the seat assembly is installed in the vehicle, the occupiable surface being sufficiently sized to support a generally horizontally-oriented occupant and having a forward edge and a rearward edge;
   a belt having first and second ends being spaced a transverse distance apart from one another and mounted with respect to the seat;
   a buckle being rearward of the forward edge;
   a latch plate being releasably engageable with said buckle and being operatively connected to the belt;
   said belt being selectively movable to a deployed position in which the latch plate is engaged with the buckle, a first segment of the belt extends from the first end to the latch plate and over the forward edge of the occupiable surface, and a second segment of the belt extends from the second end to the latch plate and over the forward edge of the occupiable surface.

2. The seat assembly of claim 1, wherein said latch plate is slidably connected to the belt.

* * * * *